(No Model.)
J. J. BUTLER.
HAND CULTIVATOR.
No. 312,185. Patented Feb. 10, 1885.
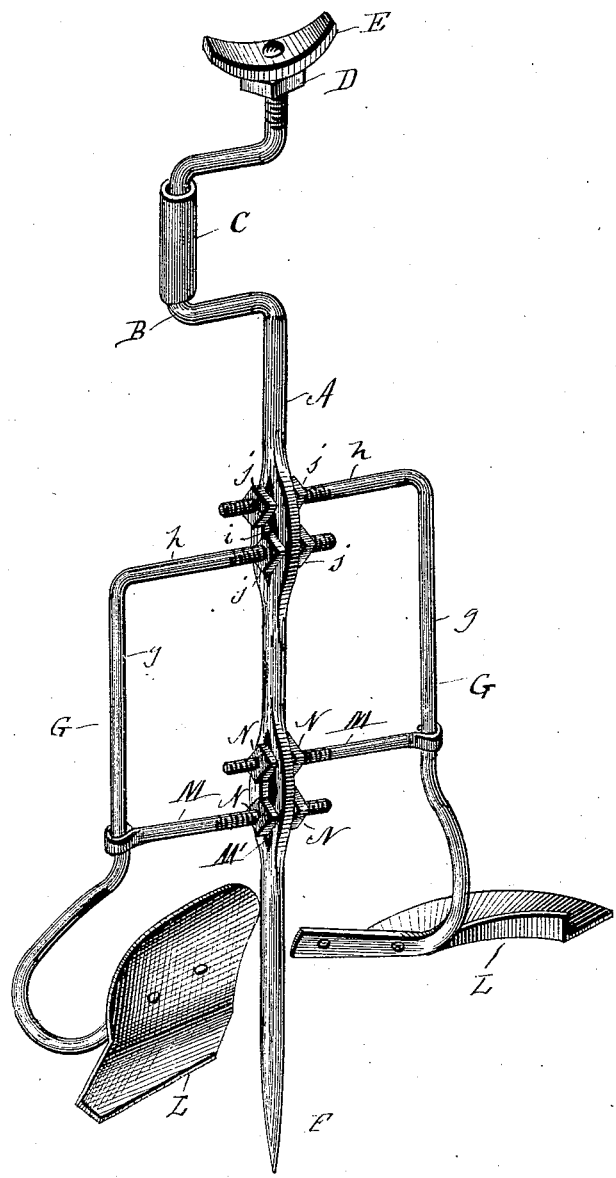
WITNESSES
Phil C. Dietrich.
F. O. McCleary.
INVENTOR
J. J. Butler
By Soule & Co.
ATTORNEYS

United States Patent Office.

JOSEPH J. BUTLER, OF CROMWELL, KENTUCKY.

HAND-CULTIVATOR.

SPECIFICATION forming part of Letters Patent No. 312,185, dated February 10, 1885.

Application filed August 8, 1884. (No model.)

*To all whom it may concern:*

Be it known that I, JOSEPH J. BUTLER, a citizen of the United States, residing at Cromwell, in the county of Ohio and State of Kentucky, have invented certain new and useful Improvements in Hand-Cultivators; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

My invention relates to hand-cultivators, the object being to provide an implement of this character which shall be adjustable to vary the dimensions of the openings drilled by it, and convenient and durable in use.

The invention consists in the combination, with a shaft formed with a "bit-brace" end, of adjustable frames carrying shovels, as will be fully described hereinafter.

The drawing represents a perspective view of the device.

A is a shaft formed near its upper end with a bend, B, upon which is arranged a sleeve, C. The upper extremity of the shaft is provided with a nut, D, and a hand-piece, E. The lower end, F, of the shaft is pointed to enter the ground.

G G represent frames consisting of side pieces, *g g*, bent at their upper ends to form arms *h h*, which pass through a slot, *i*, formed in the shaft A, so as to rest one above the other. These arms *h h* are screw-threaded at their ends, and are secured adjustably by nuts *j j*, arranged on each side of the shaft, as shown. The lower ends of the side pieces, *g g*, of the frames are bent inwardly, and each is provided with a shovel or blade, L.

M M represent arms projecting inwardly from the side pieces of the frame below the arms *h h*, and parallel with the latter. These arms M M are also threaded and pass through a slot, M', of the shaft, and are held adjustably by nuts N.

From the description thus given it will be seen that the implement is to be operated as an auger, the bit-brace end of the shaft admitting of a convenient revolution of the shaft.

The frames G G may be readily adjusted toward or away from each other to vary the size of the opening to be drilled.

The implement as thus described is adapted for use as a garden-tool for boring holes for planting and for stirring up the earth around the plant. It may also be used as a post-hole digger.

Having fully described my invention, what I claim as new, and desire to secure by Letters Patent, is—

1. A hand-cultivator consisting of the combination, with a shaft having a pointed lower end and of bit-brace form at its upper end, of adjustable frames and shovels secured to said frames, substantially as set forth.

2. In a hand-cultivator, the combination, with a slotted shaft, of frames provided with shovels and parallel threaded arms, the latter projecting through the slots of the shaft, and being held adjustably by nuts, substantially as set forth.

In testimony whereof I affix my signature in presence of two witnesses.

JOSEPH J. BUTLER.

Witnesses:
H. P. SHARER,
V. S. RENDER.